Archibald Munro & W.m B. Adamson,
Improvements in Tools for Cutting or Dressing Stone etc.,
and in Holders and Mechanism for Operating the same.

5 SHEETS
SHEET 1.

No. 104055

PATENTED JUN 7 1870

N° 104,055
5 SHEETS
SHEET 2.
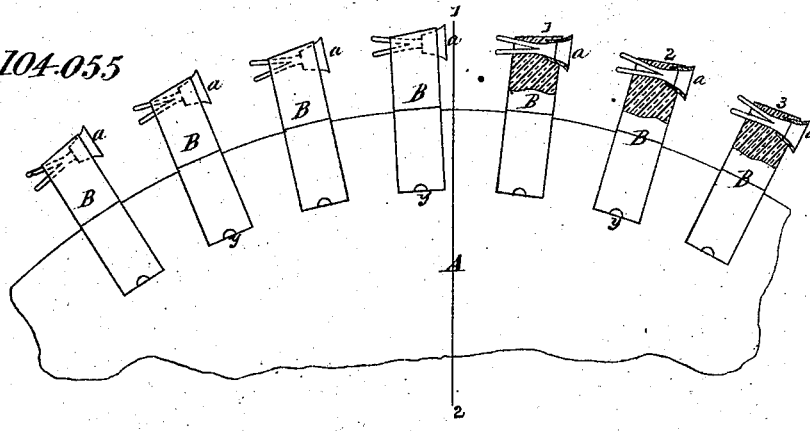
FIG. 4.   FIG. 5.
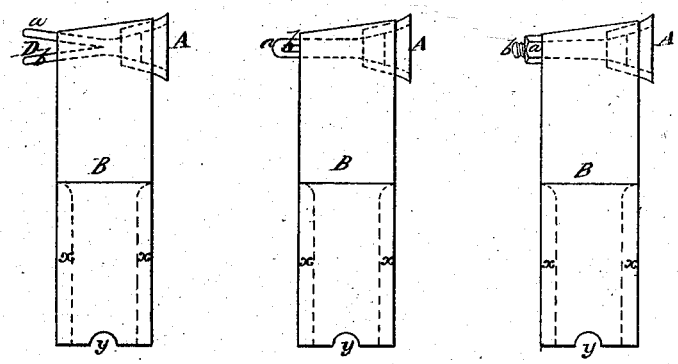
FIG. 1.   FIG. 3.   FIG. 2.
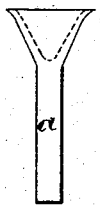
FIG. 12.
   
FIG. 8.   FIG. 9.   FIG. 10.   FIG. 11.
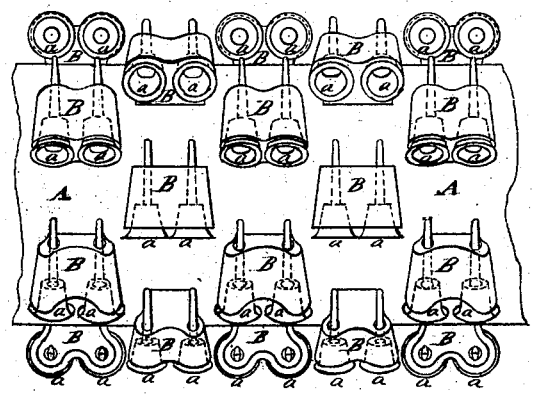 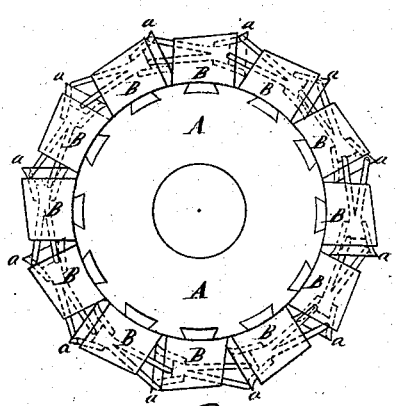
FIG. 6.   FIG. 7.
John Brown Witness
John C. Macandie Witness
Arch'd Munro
W. B. Adamson

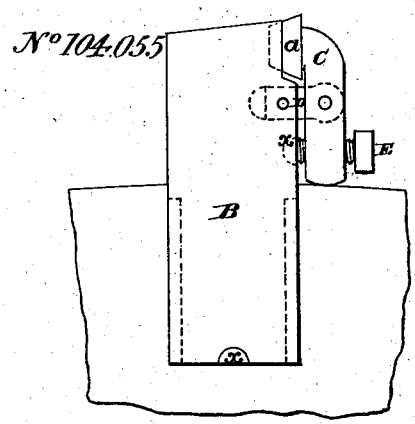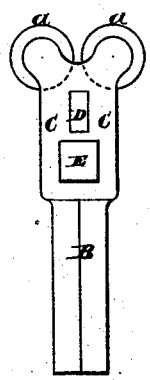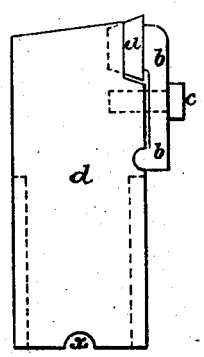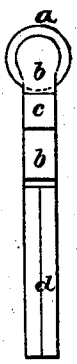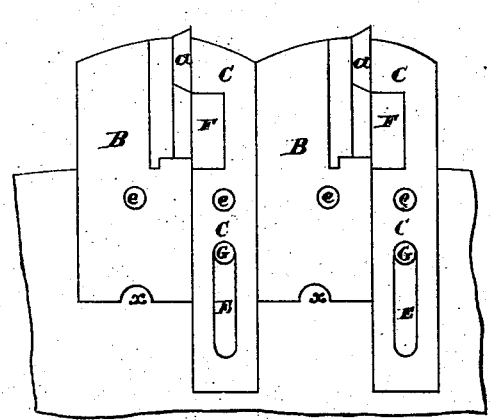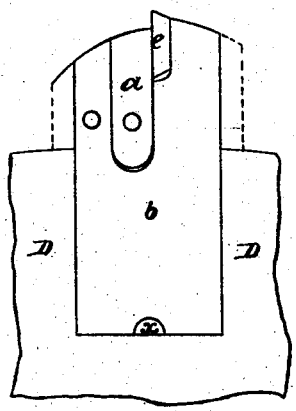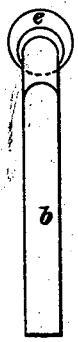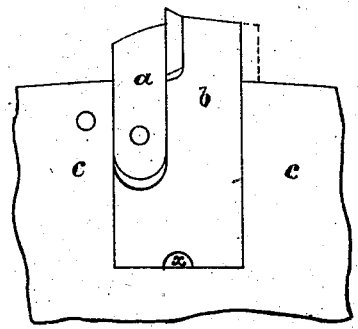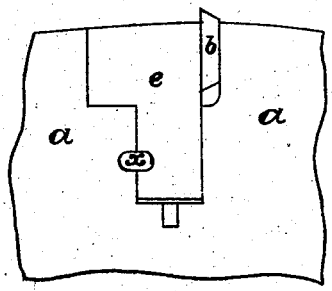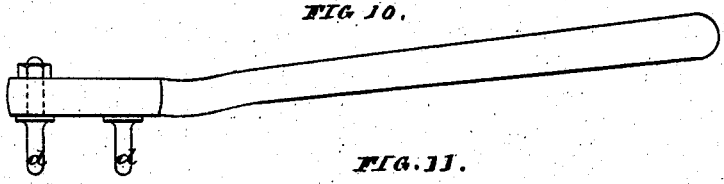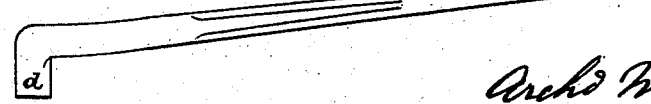

N° 104,055

N° 104,055
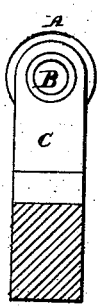 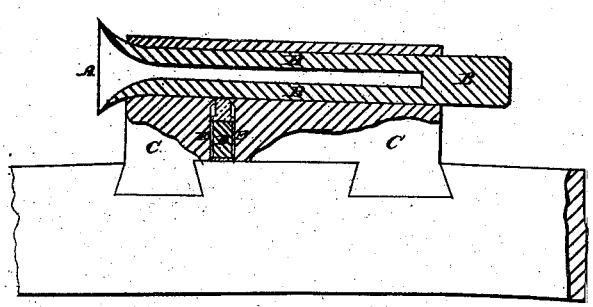
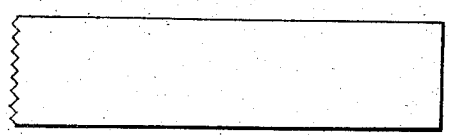 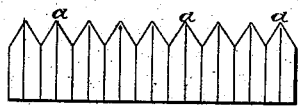
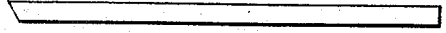 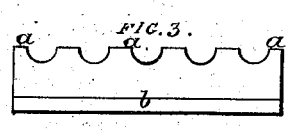 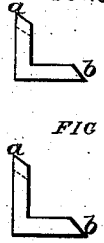
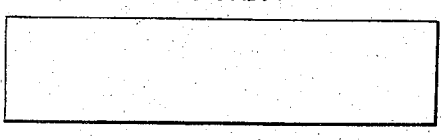 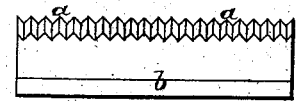 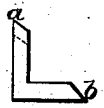
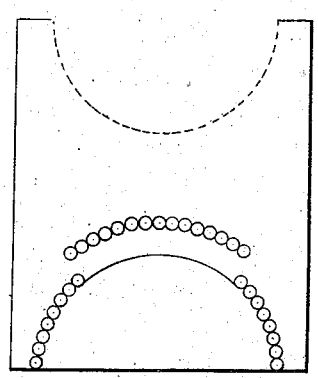 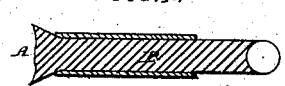
 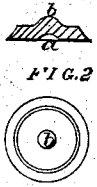 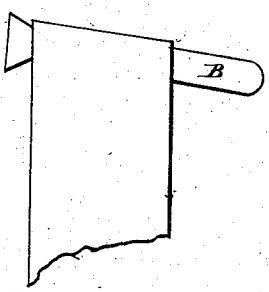
 
 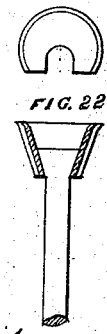 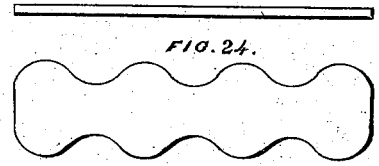
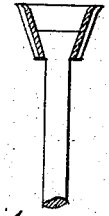 
John Brown Witness  Arch'd Munro
John C. Macandie Witness  W. B. Adamson

United States Patent Office.

ARCHIBALD MUNRO, OF ARBROATH, AND WILLIAM B. ADAMSON, OF GLASGOW, NORTH BRITAIN.

Letters Patent No. 104,055, dated June 7, 1870.

IMPROVED MACHINE FOR CUTTING AND DRESSING STONE.

The Schedule referred to in these Letters Patent and making part of the same.

To all whom it may concern:

Be it known that we, ARCHIBALD MUNRO, of Arbroath, Forfar county, North Britain, and WILLIAM B. ADAMSON, of Glasgow, Lanark county, North Britain, have invented certain Improvements in Tools for Dressing Stone, &c.; and we do hereby declare the following to be a full, clear, and exact description of the same.

Nature and Object of the Invention.

This invention relates to tools for cutting or dressing stone, slate, rock, or other similar substances, the tools being caused to operate upon the said substances by means of mechanism provided with tool-holders, in which the tools are retained in a working position.

Description of the Accompanying Drawing.

Figure 1 (Sheet No. 1) is a side elevation of sufficient of a stone-dressing machine to show one mode of employing our improved tools, and the construction of the same.

Figure 2, an edge view of fig. 1.

Figures 3 and 5, side views illustrating another mode of arranging the cutters.

Figures 4 and 6, sectional views of figs. 3 and 5.

Figures 7 to 17, detached views showing the construction of the tools.

Figures 1, 2, 3, and 4, (Sheet No. 2,) views of tool-holders, with the tools attached.

Figure 5, a section on the line A a, fig. 4.

Figure 6, a side view of a drum, with the tools arranged upon the same.

Figure 7, an end view of fig. 6.

Figures 8 to 12, detached views of the tools and parts of the holders.

Figures 1 to 9, (Sheet No. 3,) views showing modified forms of holders, and the manner of applying the same to the blades.

Figures 10 and 11, instruments for securing the tools in their positions.

Figure 1, (Sheet No. 4,) a side view of a revolving drum, showing the same arranged for dressing stone steps or cornices.

Figure 2, a transverse section of figure 1.

Figure 3, an end view of fig. 1.

Figures 4 and 7, side views of drums of different forms.

Figures 5 and 6, end views of figs. 4 and 7.

Figure 1 (Sheet No. 5) is a side view of a barrel for dressing semicircular columns, &c.

Figures 2 to 11, views illustrating tools of different forms.

Figures 12 to 16, views showing modified forms of holders.

Figures 17 to 24, views showing modified forms of tools.

General Description.

Before proceeding to describe the construction of our improved tools, and the manner of using the same, it may be stated that the said tools may be made of iron or steel, or of compound metals, (chilled, if desired,) cast, forged, or pressed into shape, and tempered or hardened, or of malleable iron, forged or pressed into shape, and afterward case-hardened.

In Sheet No. 1, B is a plate or blade containing holders, A, carrying the tools a, the holders A being held in the plate B by dovetail or V-joints, as hereinafter more fully set forth.

The tools a are retained in place by the action or pressure of the pinching-screws b on the movable jaws C, and, when the tools are worn out, they are removed by loosening the screws b, at which time new or fresh tools are inserted in the holders or sockets.

When the tools are used with a plate or blade such as that shown at figs. 1 and 2, the plate or blade B is firmly fixed upon a shaft which passes through a hole in the boss D. The shaft, being part of any stone-cutting or dressing-machine wherein such tools may be employed, (which machines, however, form no part of this invention,) is caused to move or travel over the stone to be operated upon, or, vice versa, the stone is caused to move or travel under or over it.

The edge of the plate or blade B is slightly inclined from the center toward the extremities, as shown, so that each tool a, in a direction proceeding from the outermost tool toward the center of the edge of the plate or blade, is a little lower down than that which precedes it. By this arrangement of the tools, when they are cutting or dividing a block of stone or other material, the tool numbered 1 enters the cut first and proceeds throughout the cut in the stone at one depth, while that marked 2 follows at a slightly lower depth, which depth varies, according to the nature of the stone, rock, slate, or other material to be operated upon, and so on, according to the number of tools employed; thus, by using a number of tools, each making but a shallow cut of itself throughout the stroke, the aggregate of these shallow cuts represent a deep cut per stroke or travel of the tools over the stone or other material.

On further referring to fig. 1, it will be observed that, on either side of the center line, the tools face in opposite directions, so that a cut is made on both the forward and backward travel or stroke of the blade or plate or stone, according as either the blade or plate or stone is fixed or travels, or the tools may be arranged in the blade or plate to face in one direction.

Figure 1:
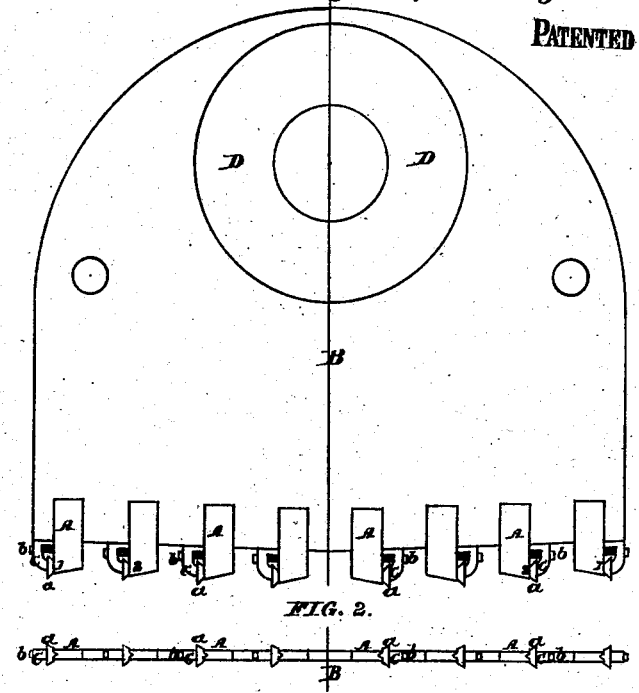

On sheet 2 of the appended drawing, fig. 1 is a side elevation of a tool-holder or socket for holding another form of tool, and which is or may be attached to a revolving or reciprocating or fixed blade or plate of a machine for cutting or dressing stone, slate, rock, or other substances, and showing one method of holding the tool therein.

The tool is of a truncated conical form.

The recess or hole in the tool-holder B is formed to correspond with the smaller end of the tool A, which is secured in the holder by the spring bolt D, the head or upper end of which bolt fits into the interior conical hollow of the tool A, and the tails *a* and *b* of which, by their outward pressure against the sides of the hole formed in the tool-holder B to receive them, retain the tool A firmly in its postition, at the same time allowing of its easy removal when required.

Figure 2:
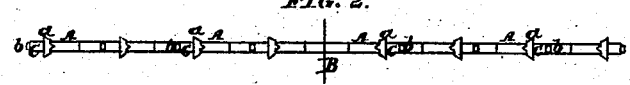
Figure 3:
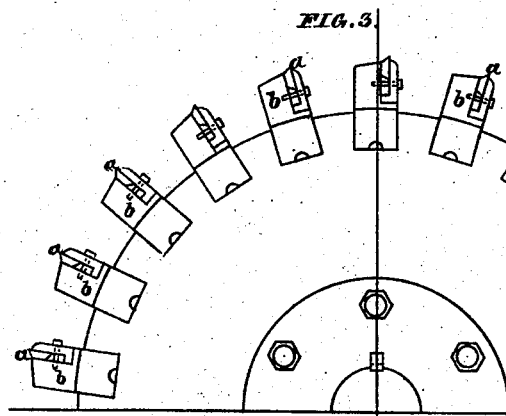
Figs. 3 and 4 are respectively a half side elevation and half transverse section of a circular disk for carrying the tools *a* and tool-holders *b*, similar to what are shown at *a* and *b*, figs. 1 and 2.

The tool-holder, B, is attached to the revolving, or reciprocating, or fixed disk blade, or plate of the cutting or dressing-machine, by a recess formed in the blade or plate, whose sides correspond to the groove in the tool-holder, seen in dotted lines at figs. 1, 2, and 3, and marked *x*.

Fig. 2 is a side elevation of a similar tool-holder to that above described, but in this case the tool A is secured in the holder by a nut, *a*, and bolt *b*.

Fig. 3 is also an elevation of a similar tool-holder, but in this case, in lieu of securing the tool A, as in the two previous modifications, it is retained in the holder B by a bolt, *a*, and cotter *b*. It is preferred, however, to fix the tools by spring bolts, as shown at fig. 1, or by a plain bolt, fitting tightly into the hole or socket in the holder B.

Figure 4:
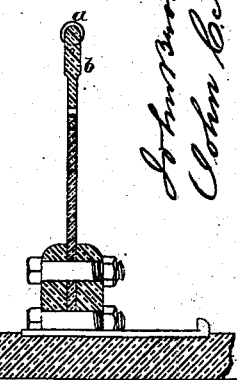

Fig. 4 is an elevation of a circular-saw blade or plate, A, in which are carried several tool-holders, B, similar in construction to those above described, in reference to this sheet of drawing. Some of the holders B, in fig. 4, namely, those marked 1, 2, and 3, respectively, are shown partly in section, as also the tools *a*, retained therein.

Figure 5:
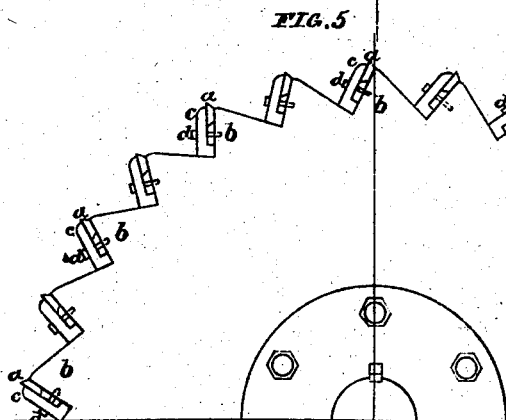
Figs. 5 and 6 are respectively a half side elevation and half transverse section of a serrated disk for carrying the tools *a*, each serration *b* of which forms a jaw of the tool-holder, between which jaws *b* and the gripers *c* the tools *a* are securely held by means of the pinching-screws *d*.

Fig. 5 is a transverse section, on the line 1 2, of the portion of the circular-saw blade or plate shown at fig. 4.

The tool-holders shown at figs. 1, 2, 3, 4, and 5, have a semicircular hole, *y*, formed in their under edges, to receive a wedge, by which they may be driven out of the disk or plate, when required.

Figure 6:
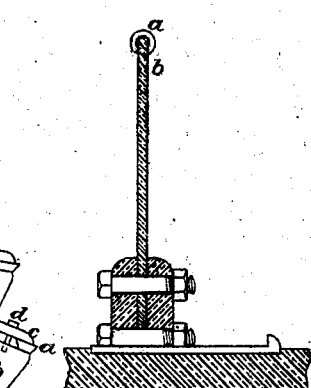

At fig. 6 is shown an elevation of part of a barrel, A, for dressing stone, slate, marble, and other substances, and which barrel is fixed to a revolving shaft of a stone-dressing machine, such machine, however, forming no part of the present invention.

The shaft may be situated vertically or horizontally, or at any angle, and is capable of being raised or lowered, as required, so that the tools *a*, carried in the holders B, may cut or dress any part of the stone, or other material, carried on the table of the machine. The tool-holder B may be dovetailed into the barrel A, as shown at fig. 7, or the tool-holder may be screw-tapped or wedged into the barrel A, or attached to it.

Figures 7, 8, 9, 10, 11, 12, 13, 14, 15, 16, 17:
Figure 2:
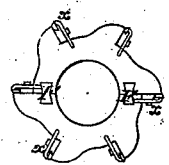
Figure 1:
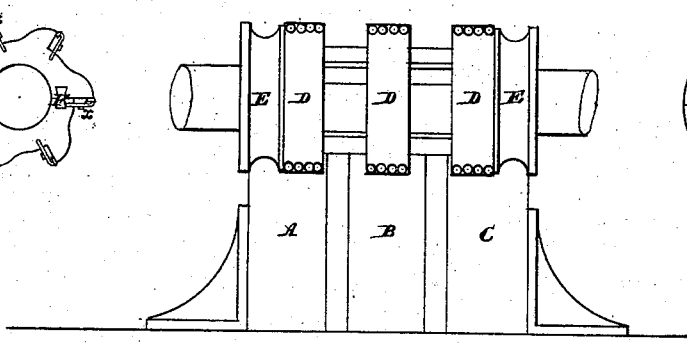
Figure 3:
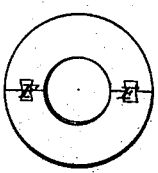
Figure 4:
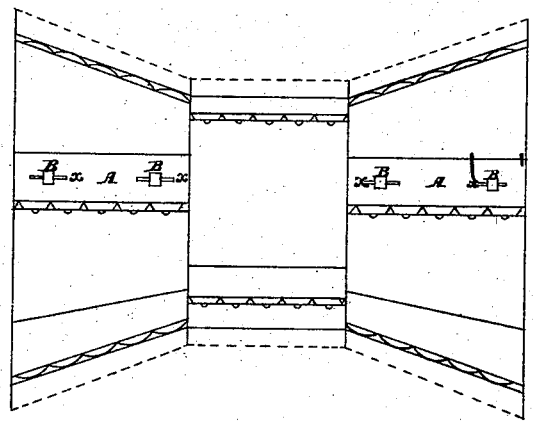
Figure 5:
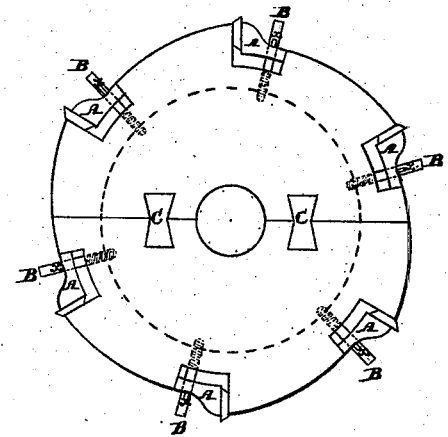
Figure 6:
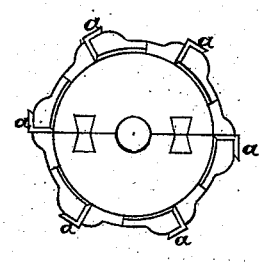
Figure 7:
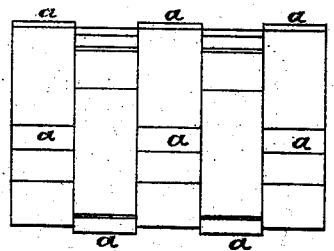

Fig. 7 is an end elevation of the barrel A and tools shown at fig. 6. The tool-holders B, shown at the holders hereinbefore described, being formed duplex, that is to say, each holder contains two tools, but holders for one, or any other number of tools, may be employed.

At figs. 1 and 2, sheet 3, are shown a side and front elevation, respectively, of another form of duplex tool-holder. In this instance, the tools *a* are placed in notches or hollows, formed to receive them, in the tool-holder B.

The griping-piece, C, by which the tools are held in position, is hinged to the tool-holder B by the link D, so that the griping-piece acts as a lever, the griping power being obtained by means of the screw E, tapped into the griping-piece, and acting against the shoulder *x* of the tool-holder B.

Fig. 3 is a side elevation, and fig. 4 a front elevation of another form of holder, for one tool. In this arrangement the tool *a* is held in the tool-holder by the lever or griper *b*, which is secured by the bolt C to the tool-holder *d*.

At fig. 5 is shown a side elevation of another method of securing the tool-holders in the blade or plate of a circular saw. The tool-holders B B are, in this instance, arranged in pairs, as shown, the tools *a a* being secured in the tool-holders in the manner now next set forth.

The tools *a a* are formed with projections on the back, which fit into corresponding grooves in the face of the holders B B, and in which grooves they are securely retained by the gripers C, which slide in openings made in the disk. When it is required to remove the tools *a a* from the holders B, the gripers C are forced out by a lever, such as is shown at fig. 10, the pins *d d* of the lever being made to fit into the holes *e e*, formed in the tool-holders B and gripers C.

In the gripers C slots, F, are formed, of sufficient length to allow the tools *a a* to be taken out and replaced.

The gripers C are also formed with slots, E, through which pins, G, pass, in order to prevent the gripers, when forced out by the lever, shown at fig. 10, from falling out of their places.

Fig. 6 represents a side elevation and fig. 7 a front elevation of another form of tool-holder, which may be attached to a circular-saw blade or plate. The griping-piece *a* is, in this instance, placed in a notch or check, formed in the tool-holder *b*, to receive it. The tool-holder *b* may be formed with straight edges, as shown by the firm lines, or it may have shoulders as shown by the dotted lines, which shoulders rest upon the edge of the circular disk or plate D.

When it is required to move the tool *e* from the holder, the griper *a* is forced out by the lever, shown at fig. 10, as hereinbefore described with reference to fig. 5.

At fig. 8 is shown another modification of tool-holders, in which the griper *a* is placed between the edge of the tool-holder *b* and the disk or plate C, the griping-piece *a* being actuated by a lever, as in the two preceding modifications.

Fig. 9 is a side elevation of another modification of tool-holder, in which the disk or plate *a* is formed to receive the tool *b* and griping-piece *c*. In this modification the griper *e* is removed, when required, by means of a lever similar to that shown at fig. 11, which lever is formed with an elongated pin or stud, *d*, which fits into a corresponding hole, *x*, formed partly in the disk or plate *a* and partly in the griper *e*.

The tool-holders, figs. 1, 2, 3, 4, 5, 6, 7, and 8, are, by preference, all formed with a hole, *x*, in their bottom edge, so that, by forcing a taper-drift or punch therein, that is to say, between the body of the holder and the disk blade or plate, they may be driven out of the disks, blades, or plates On sheet 4, of the appended drawing, fig. 1 is a front elevation, fig. 2, a transverse section, and fig. 3, an end elevation of a revolving barrel or drum, which may be employed in dressing door or stair-steps, or it may be employed for plain or flat work, or moldings, the shape or contour of the revolving barrel being formed according to the nature of the work to be performed.

On the appended drawing the revolving barrel is shown as dressing door or stair-steps. The part of the barrel which is employed in dressing the plain parts of the steps, A, B, and C, is constructed, longitudinally, of separate segments or sections, D D, as shown at fig. 1. The parts E E, employed in dressing the bead or molding on the front of the steps, are formed by themselves, so that they may be removed, and the half of the barrel or drum lengthened by the addition of other disks or sections to the shaft of the barrel or drum, when required.

That this may be effected the more easily, the segments are formed in halves, which are held together by dovetail joints or tongues, F, as shown particularly in end elevation at fig. 3.

The face of the drum or barrel is grooved transversely, as shown at fig. 2, to receive the tools, which are held in position by the gripers or jaws x.

Should the stones require to be finished in a better style of work than can be accomplished by the dressing barrel, they may be finished by a planing-machine, after having been roughly cut by the barrel, as hereinbefore set forth.

In lieu of arranging the barrel in a horizontal position, as shown, it may be arranged to work in a vertical position, or at any required angle.

Fig. 4 is a side elevation, and fig. 5 an end elevation of a barrel for dressing "copes," or coping-stones for walls or parapets.

The tools are fitted into the barrel in the manner shown at fig. 5, and are held in position by the jaws or gripers A, which pass over the eye-bolts or studs B, one end of which studs is screwed into the barrel.

The gripers are secured by the wedges or cotters x, which pass through the eyes in the bolts or studs B.

The barrel is made in halves, which are held together by the dovetail-joints or tongues C, as hereinbefore described in reference to figs. 1, 2, and 3, sheet 4.

The dotted lines on fig. 4 represent the figure which is generated by the revolution of the barrel and the sectional form of the "cope" produced.

Fig. 6 is a side elevation, and fig. 7 an end elevation of a dressing barrel, in which tools a, in section of the form known as "angle-iron," are used. The general and various forms of these tools are shown more particularly in elevation at figs. 2, 3, and 4, and in section at figs. 5, 6, and 7, sheet 5, of the appended drawing, and as hereinafter more particularly described.

On sheet 5, fig. 1 is a side view of a barrel for dressing semicircular copes, "stories," columns, or cylinders, plain or fluted, the details of which are the same or similar to those of the other dressing-barrels hereinbefore described.

Having now described the various modifications of tool-holders and other details of stone-cutting or dressing machinery shown on the appended sheets of drawing, we now proceed to specify more particularly the various shapes or configurations of tools shown thereon.

On sheet 1, figs. 7, 8, 9, 10, 11, and 12, are, respectively, plans and elevations of three different shapes or configurations of tools, made of any of the materials hereinbefore set forth.

On the back of each of the tools shown at figs. 7, 8, 9, and 10, ʌ-shaped projections a are formed, which fit into corresponding grooves in the tool-holders, to which they are fitted.

On figs. 11 and 12 the projection a is circular, as shown.

Fig. 13 is a plan, and fig. 14 an elevation of another form of cutting-tool, the face and edges of which are slightly concave, and having the projection a, by which it is secured in the tool-holder, of a circular form, as shown on the drawing.

Figs. 15 and 16 are, respectively, a plan and elevation of a cutting-tool, having the projection a, by which it is secured in the tool-holder, of a rectangular form, and the face and edges concave, as in the preceding modification.

Fig. 17 is a plan of a triangular tool, which may either have the face and edges concave, as shown in the two preceding modifications, or of the configuration shown in elevation at figs. 8 and 10.

The projection a, on the back of the tool, is that by which it is held in the tool-holder.

On sheet 2, in lieu of employing truncated conical tools of circular section, as shown at A in the various tool-holders, conical tools of elliptical or oval section, as shown at figs. 8 and 9, or tools square in section, as shown at figs. 10 and 11, may be employed.

At fig. 12 is shown an elevation of a truncated conical tool, with a shank or stem, a, formed on it, by which it is held in the tool-holder or socket.

On sheet 5, figs. 2, 3, 4, 5, 6, and 7, are, respectively, views of tools having an "angle-iron" section, which may be attached to a barrel for dressing stone, slate, marble, or other substances.

At figs. 6 and 7, sheet 4, is shown one modification of the tools so attached. One edge of the tools is formed into sharp projections a, which are used for roughing out the blocks of stone or other material being operated upon, and the other edge b is made plain, and employed in producing a smooth or finished surface.

After the block of stone or other material has been dressed by the revolving barrel or drum, it may be planed or smoothed by tools, such as are shown at figs. 8, 9, 10, and 11, which tools are fitted into a planing-machine for that purpose, or these tools may be fitted on a shaft on the same machine as the revolving barrel.

Fig. 12 is an end elevation, and fig. 13 a longitudinal section of another modification of tool and tool-holder, which may be used in cutting or dressing stone, slate, marble, or other material.

The tool A is formed with a hollow shank or stem, B, and is secured in the holder C by means of an India-rubber or other spring, D, placed in a hollow or socket, E, formed in the holder C to receive it.

At figs. 14, 15, and 16 are shown different views of another modification of a tool for cutting or dressing stone, slate, marble, or other material. The tool is formed with the cutting or dressing-face A concave, in the manner shown at fig. 14, and also with a solid stem or shank, B, which fits into the tool-holder, as shown at figs. 15 and 16.

Fig. 17 is a plan and fig. 18 an elevation of a horseshoe-shaped tool which may also be used for cutting or dressing stone or other substance; and fig. 19 is a transverse section, and fig. 20 a plan of a cutting or dressing-tool, which is formed with a concave edge.

On the face of the tool a semicircular indentation, a, is formed, into which fits a corresponding projection on the tool-holder, and on the back of the tool a projection, b, is formed, which fits into a groove of similar form in the griping-jaw of the tool-holder.

Fig. 21 is a plan and fig. 22 a side elevation of a form of cutting-tool which may be attached to the barrel or to the revolving disk shown on sheet 2, in lieu of the tools shown therein. In this instance the tool is curvilinear in form, as shown particularly in plan at fig. 21.

Fig. 23 is a plan and fig. 24 a side elevation of a serrated tool, which may also be attached to a revolving barrel for dressing stone, slate, rock, or other material, in lieu of any of the tools hereinbefore described.

Claims.

1. A tool for dressing stone, consisting of a solid or hollow cone, disk, or plate, secured to the edge of a permanent or detachable projection on a plate-disk or holder, and at right angles, or thereabout, to the side of the said projection.

2. The combination of said tool, a clamp, and a screw or other device for pressing the clamp against the tool.

3. The said tool, adapted to a recess in a holder, in combination with a permanent or detachable stem, extending into the holder, and retaining the tool in its position.

In testimony whereof we have signed our names to this specification in the presence of two subscribing witnesses.

ARCHD. MUNRO.
W. B. ADAMSON.

Witnesses:
J. BROWN,
J. C. MACANDIE.